United States Patent [19]

Gurley et al.

[11] Patent Number: 5,473,390
[45] Date of Patent: Dec. 5, 1995

[54] COMPONENT TO COMPOSITE VIDEO SIGNAL CONVERTER CIRCUIT

[75] Inventors: Thomas D. Gurley; Gene K. Sendelweck; Thomas D. Yost, all of Indianapolis, Ind.

[73] Assignee: Thomson Consumer Electronics, Inc., Indianapolis, Ind.

[21] Appl. No.: 382,223

[22] Filed: Jan. 31, 1995

[51] Int. Cl.⁶ .................................................. H04N 9/64
[52] U.S. Cl. ......................... 348/708; 348/707; 348/692; 348/728
[58] Field of Search .................................. 348/566, 659, 348/663, 692, 707, 708, 712, 713, 728, 711, 571, 624; 330/69; 358/184; H04N 5/14, 9/64

[56] References Cited

U.S. PATENT DOCUMENTS

| | | | |
|---|---|---|---|
| 4,167,021 | 9/1979 | Holmes | 348/663 |
| 5,032,900 | 7/1991 | Sendelweck | 358/21 R |
| 5,107,341 | 4/1992 | Sendelweck et al. | 358/22 |
| 5,202,765 | 4/1993 | Lineberry | 358/183 |
| 5,296,921 | 3/1994 | Klink | 348/711 |

Primary Examiner—James J. Groody
Assistant Examiner—Sherrie Hsia
Attorney, Agent, or Firm—Joseph S. Tripoli; Peter M. Emanuel; Richard G. Coalter

[57] ABSTRACT

A bias source (R7,R8,C24) connected to a summing amplifier (Q1) produces a first DC bias at the amplifier input (emitter) and a second DC bias at the amplifier output (collector). A first circuit node (B) is AC coupled (22) to a luminance signal source (Y1, 18), DC coupled via a first resistor (R4) to the input of the summing amplifier and DC coupled via a first amplifier (28) to a luminance load (Y3,30). A second circuit node (A) is AC coupled (20) to a chrominance signal source (C1,18), DC coupled via a second resistor (R3) to the input (emitter, Q1) of the summing amplifier and DC coupled via a second amplifier (26) to a chrominance signal load (C3,30). A third amplifier (Q2) provides DC coupling of the output of the summing amplifier (Q1) to a composite video signal load (E,40). Advantageously, the circuit provides component to composite conversion with plural buffered outputs which may exhibit different power gains, which are stable notwithstanding load impedance variations and which are DC biased by bias produced at the summing amplifier input as well as its output thereby simplifying the conversion and buffering.

10 Claims, 4 Drawing Sheets

COMPONENT TO COMPOSITE VIDEO SIGNAL CONVERTER CIRCUIT

FIELD OF THE INVENTION

This invention relates generally to video signal processing and particularly to circuits for converting component video signals to composite form.

BACKGROUND OF THE INVENTION

In certain applications it is desirable to process luminance and chrominance signals in a combined or composite form and in other applications it may be desirable to maintain the signals in a separated or component form. For example, conventional consumer video cameras and video cassette recorders provide video output signals in composite form in which luminance and chrominance signals are combined so as to form a single "composite" video signal. Advantageously, the composite form of color video transmission only requires a single coaxial cable for connection to a monitor or recorder input. For higher quality consumer applications it is common to provide video output signals in a separated or "component" format in which the luminance and chrominance components are not mixed but rather are available separately. Such a transmission format is used in so-called "SVHS" (super VHS) consumer products.

In certain applications it is desirable to be able to convert video signals from component to composite form. One such application is described by Klink in U.S. Pat. No. 5,296,921 entitled TWO PORT NETWORK WITH SHARED ELEMENTS FOR COMBINING AND FILTERING LUMA AND CHROMA COMPONENTS TO FORM COMPOSITE VIDEO SIGNAL which issued Mar. 22, 1995. In an example of the Klink apparatus, a two-port passive filter network is used to combine luminance and chrominance components within a picture in picture processor in such a manner as to suppress certain visual artifacts characteristic of the specific picture in picture processing described. The use of passive networks, however, precludes use of the combined signals in certain applications such as cases in which a power gain may be desired. The use of active networks heretofore has required relatively complex circuitry and particularly so where plural buffered outputs are required which may require different transmission gains at different outputs and which may be subjected to varying load impedances.

SUMMARY OF THE INVENTION

The present invention is directed to meeting the need for a circuit of simplified design capable of providing component to composite conversion with plural buffered outputs which may exhibit different power gains and which is tolerant of extreme output load impedance variations both as to AC and DC components of the output signals provided.

In accordance with the invention, a bias source (R7,R8, C24) connected to a summing amplifier (Q1) produces a first DC bias at the amplifier input (emitter) and a second DC bias at the amplifier output (collector). A first circuit node (B) is AC coupled (22) to a luminance signal source (Y1, 18), DC coupled via a first resistor (R4) to the input of the summing amplifier and DC coupled via a first amplifier (28) to a luminance load (Y3,30). A second circuit node (A) is AC coupled (20) to a chrominance signal source (C1,18), DC coupled via a second resistor (R3) to the input (emitter, Q1) of the summing amplifier and DC coupled via a second amplifier (26) to a chrominance signal load (C3,30). A third amplifier (Q2) provides DC coupling of the output of the summing amplifier (Q1) to a composite video signal load (E,40).

Advantageously, the circuit provides component to composite conversion with plural buffered outputs which may exhibit different power gains, which are stable notwithstanding load impedance variations and which are DC biased by bias produced at the summing amplifier input as well as its output thereby simplifying the conversion and buffering.

BRIEF DESCRIPTION OF THE DRAWING

The foregoing and further features of the invention are shown in the accompanying drawing, wherein like elements are denoted by like reference designators and in which.

DETAILED DESCRIPTION

Figure 1:
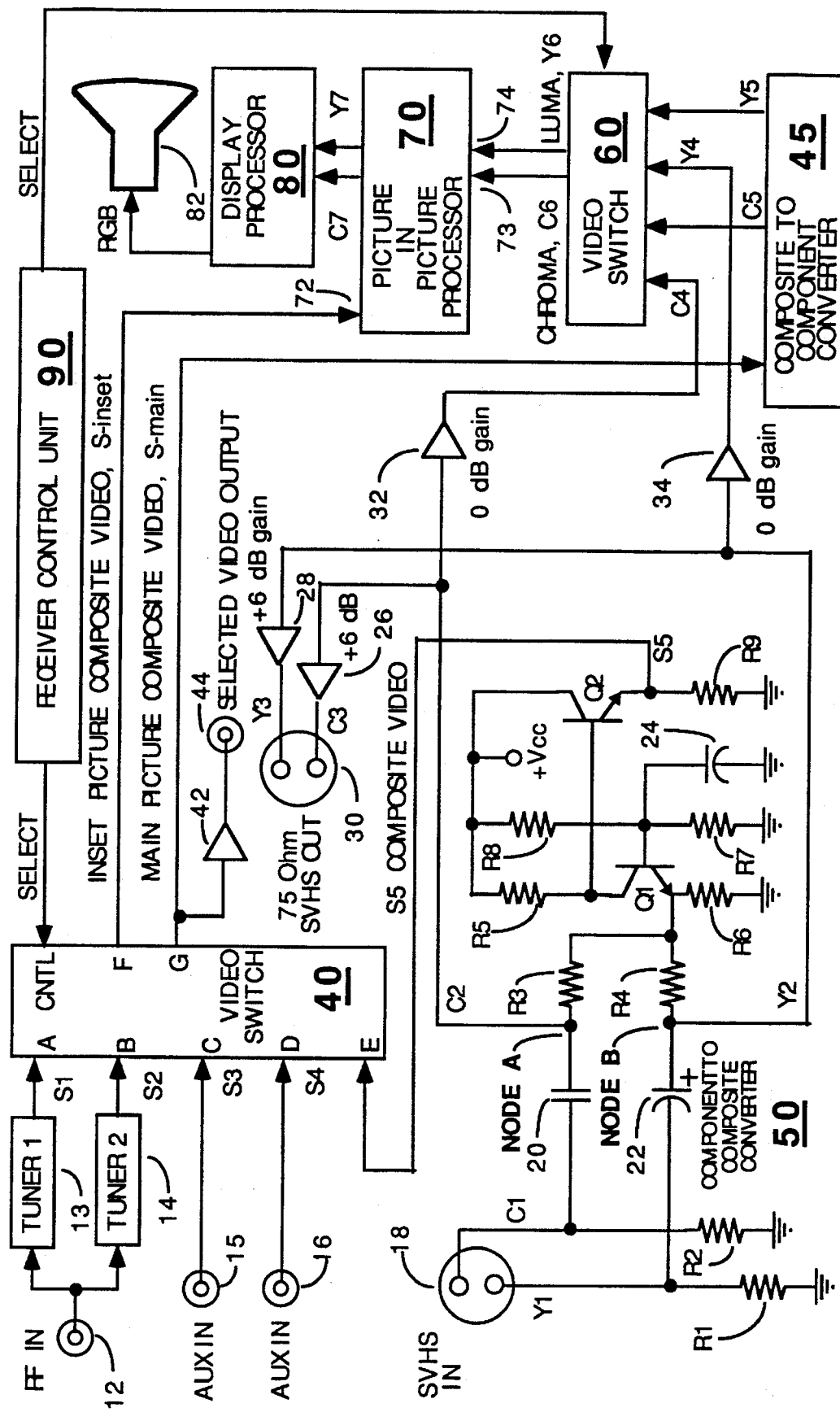
FIG. 1 is a block diagram, partially in schematic form, of a television receiver embodying the invention.

The television receiver of FIG. 1 illustrates a desirable and useful application of the component to composite converter circuit 50 of the present invention. The receiver provides picture in picture display of composite video signals and a component video signal and includes circuitry which enables any one of the input signals to be displayed as a main picture or as an inset picture.

The receiver comprises a picture in picture (hereafter "PIP") processor 70 having luminance and chrominance outputs coupled to supply picture-in-picture video signals (Y7, C7) to a display unit 82 via a display processor 80. Processor 80 provides conventional functions such as brightness, contrast, hue and saturation control and provides matrixing of the component input signals Y7 and C7 to generate red, green and blue (RGB) output signals for display on unit 82. The display unit 82 may be a conventional kinescope as illustrated or another suitable display device such as a liquid crystal display, a light valve type of display or the like. The PIP processor 70 is of the conventional type having component (72) and composite (73,74) video inputs and which provides processed outputs signals (C7 and Y7) in which the component video input signal (chroma C6 and luma Y6) is displayed in the main picture area of the display 82 and the composite video input signal (S-inset) is displayed on display 82 in compressed form inserted as an inset smaller picture within the main picture area of the display.

A number of video signals may be displayed by the receiver. Selection of displayed signals is provided by two video switches 40 and 60 which are controlled by selection signals provided by a receiver control unit 90. The first switch 40 selects two output signals at outputs F and G, labeled S-inset and S-main, from a plurality of composite video input signals labeled S1 to S5 at inputs labeled A–E. The switch 40 is of a type which enables any one of the inputs A–E to be coupled to either of its outputs F and G. This type of switch may be constructed by use of two separate switch sections with one switch section selecting the inputs A–E for output F and the second switch section selecting the inputs A–E for the output G. In the alternative, the switch 40 may be of the so-called multi-port "matrix" or "cross-bar" type constructed of a matrix of individual switches to enable any input signal at any input port (A–E) to be routed to any output port (F,G).

The composite video input signals S1 and S2 applied to the first video input switch 40 are provided by respective ones of two tuner units 13 and 14, respectively, labeled TUNER 1 and TUNER 2. These tuner units have RF inputs connected in common to an RF input connector 12 to facilitate two tuner operation. For example, one may watch TUNER 1 on the main picture area while concurrently watching TUNER 2 in the inset picture area of display 82. All of the composite inputs to the first video switch 40 may be viewed in either area of the screen.

Continuing with the signal source provisions of the receiver, the composite video input signals S3 and S4 applied to inputs C and D of the first video switch 40 are provided by conventional "RCA" type baseband auxiliary input connectors 15 and 16. These connectors may be connected to conventional baseband video sources of composite form such as video cassette recorders, video disc players, video games or the like.

The composite video input signal S5 for input "E" of composite video switch 40 is provided by a "component to composite video converter", embodyig the invention, that is shown partially in schematic form, partially in block form and indicated generally by the designator "50". This converter is coupled to an SVHS input connector 18 and converts the component SVHS luminance Y1 and chrominance C1 signals of the SVHS signal to the composite form of signal S5 for application to input "E" of composite video switch 40.

Other functions provided by the component to composite video converter 50 include controlling the DC level or "bias" of the composite signal S5 as well as providing four buffered outputs Y3, Y4, C3 and C4 with DC levels derived from input terminals of a summing amplifier that combines the SVHS components to form the composite signal S5. More specifically, in converter 50 the luminance and chrominance signals Y1 and C1 coupled to ground via respective terminating resistors R1 and R2 and coupled via respective AC coupling capacitors 22 and 20 to respective input nodes "B" and "A" of a common base input summing amplifier (Q1, R3, R4) which adds the AC coupled signals Y2 and C2 to form the composite signal S5.

The conversion gain of converter 50 is ×2 (times two) or plus six decibels (+6 dB) as to the buffered signals Y3 and C3. As to the remaining buffered signals C4, Y4 and S5 (composite) the conversion gain is unity (i.e., "one" or zero decibels, 0 dB). As explained in detail later, all of the signals exhibit impedances which may vary substantially. Advantageously, neither the DC levels of the five output signals S5, C3, Y3, C4, Y4 nor the AC signal levels (gains) of these signals are adversely affected by variations in the load impedances to which they are applied.

The common base input summing amplifier comprises a common base amplifier Q1 biased at the base thereof by means of a potential divider comprising resistors R8 and R7 which are coupled from the base of Q1 to a supply voltage source (+Vcc) and a source of reference potential (shown as ground), respectively. The ratio of these resistors and the supply voltage Vcc determines the base bias for Q1 and thus the DC bias at the Q1 emitter. The collector of transistor Q1 is coupled to the supply terminal Vcc via a collector load resistor R5 and the emitter is coupled to ground via an emitter load resistor R6 and to the input nodes "A" and "B" via respective signal summing resistors R3 and R4.

In operation, the input resistors R3 and R4 provide the dual functions of (1) summing of the AC components of the chrominance C2 and luminance Y2 components of the SVHS input signal and (2) coupling the DC bias produced at the summing junction (emitter electrode of Q1) to the summing amplifier input nodes "A" and "B" for biasing a plurality of direct coupled buffer amplifiers 26, 28, 32 and 34. Two of the buffer amplifiers (26 and 28) provide buffered component (SVHS) output signals to an SVHS output connector 30 for use by another SVHS device such as a recorder.

Advantageously, one may, display SVHS signals from a SVHS disc player on display 82 while concurrently recording the disc program on tape and without any loss of luma/chroma signal amplitude of the component SVHS signal thereby preserving the full quality of the SVHS signal for both display and dubbing operations. For this purpose the gains of amplifiers 26 and 28 are set at times two (i.e., +6 dB) so that when connector 30 is connected to a terminating load (e.g., 75 Ohms) the net gain from input (connector 18) to output (connector 30) is unity or zero decibels (0 dB) indicating no gain or loss of signal level.

Another function of buffers 26 and 28 is to provide load isolation. This is important since the load impedance at connector 30 may be very high (e.g., infinite or an open circuit) when no load is connected and very low when a 75 Ohm terminating load is connected. The isolation thus provided prevents impedance variations at connector 30 from altering the AC or DC signal levels at the other outputs for signals S5, Y4 and C4.

The other two buffer amplifiers 32 and 34 are of unity gain (i.e., 0 dB) and preserve the SVHS signal amplitude for application to a component video switch 60. Advantageously, these buffers prevent any changing in the loading of switch 60 as it switches from one component signal pair (e.g., C4, Y4 from converter 50) to another component signal pair (e.g., C5, Y5 from converter 45). As with buffers 26 and 28 this isolates switch 60 from the signal summing nodes "A" and "B" and so prevents changes in switch 60 from altering the amplitudes of the SVHS signals being summed by transistor Q1 or outputted for dubbing at connector 18.

A fifth buffer amplifier, also of unity gain, comprises emitter follower transistor Q2 and its associated load resistor R9. This amplifier buffers or isolates the summed composite SVHS signal appearing at the collector of transistor Q1 for application as the composite signal S5 to input "E" of video switch 40. Advantageously, this provides the multiple functions of (1) providing a low impedance drive for the input "E" of video switch 40 so as to be able to provide a low impedance source for both the picture in picture processor 70 and the composite to component converter 45, and (2) preventing switching of switch 40 from altering the summing gain of the summing amplifier (Q1, R3, R4). In this connection, it will be noted that the summing gain of the summing amplifier is determined by the value of the collector load resistor R5 divided by the values of the luminance and chrominance input resistors R3 and R4. If, for example, R3=R4=R5, the overall gain will be unity for chroma and unity for luma. This relationship, however, holds true only for the case where the output of the summing amplifier Q1 is isolated from impedance variations at the input "E" of video switch 40 by means of a unity gain buffer amplifier (e.g., emitter or voltage follower Q2).

Returning to the discussion of switch 40, the output designated "F" is used to provide the inset picture composite video signal, S-inset, to the composite video signal input 72 of the PIP processor 70. Recall that output "F" under the control of receiver control unit 90, may select any one of five composite video inputs of switch 40. Since output "F" connects only to the composite video input of PIP processor 70 which processes the compressed "small" or "inset" image, any of the inputs A–E selected for output "F" will appear as the inset image on display 82. Thus, one may display the outputs of either tuner, of either auxiliary source (15 or 16) or of the SVHS source 18 (which is composite form after conversion in converter 50) as the inset picture on display 82. One may, of course, modify the input composite video switch 40 to accommodate more tuner, auxiliary or composite SVHS inputs if desired.

Still considering switch 40, the output labeled "G", also controlled by the receiver control unit 90, selects the main picture composite video signal labeled "S-main" for two different uses, namely, display and monitoring. As to the monitoring function, the signal at output "G" is coupled via buffer amplifier 42 to an output connector 44 labeled "selected video output". This output always represents what is being shown as the "main" image on display 82 and may be used, for example, for recording the main picture signal on a conventional composite video signal recorder. Note that even when SVHS is selected, the output "G" is of composite (combined) form and is not of the SVHS standard separated format. If an SVHS signal is being displayed (e.g., from input 18) and one wishes to record it in the wideband SVHS component form, then the SVHS output 30 is available for this purpose.

Now considering the "display" function of the composite video signal "S-main", it will be noted that this signal is applied to composite to component converter 45 which separates it into component form and the components, luminance Y5 and chrominance C5, are applied via video switch 60 to the component video inputs 74 and 73, respectively, of the PIP processor 70 for display in the "main" picture area of display 82. This display of main picture information is always of either the component SVHS input signal (C4, Y4) or the component signal S-main converted to component form (C5, Y5), as selected by switch 40.

As an example, for viewing SVHS video signals in the main picture area, the switch 60 selects the SVHS chrominance C4 and luminance Y4 components provided by buffers 32 and 34 of the converter 50 from the SVHS input connector 18. If, in this mode, one wishes a composite video output of what is being displayed it will be provided by the selected video output connector 44 which is coupled to the summing output of converter 50 via switch 40 in the SVHS mode. If one wishes to view any video signal other than SVHS in the main picture area, then the signal (e.g., S1–S4) selected by switch 40 (output G) is applied to the main video inputs 73 and 74 of PIP processor via switch 60 after conversion from composite to component form (C5, Y5) by means of the converter 45.

The composite to component converter 45 may be of conventional design, for example, such as a low pass filter for separating the luminance signal Y5 from the composite video signal S-main and a high pass or band pass filter for separating the chrominance signal C5 from the composite signal S-main. Alternatively, converter 45 may be of the more efficient "comb filter" designs for luminance chrominance signal separation filters such as a one-line comb filter or a two-line comb filter. As a further alternative, converter 45 may be of an advanced design such as a motion adaptive frame-comb filter type, all of which are well known.

Figure 2:
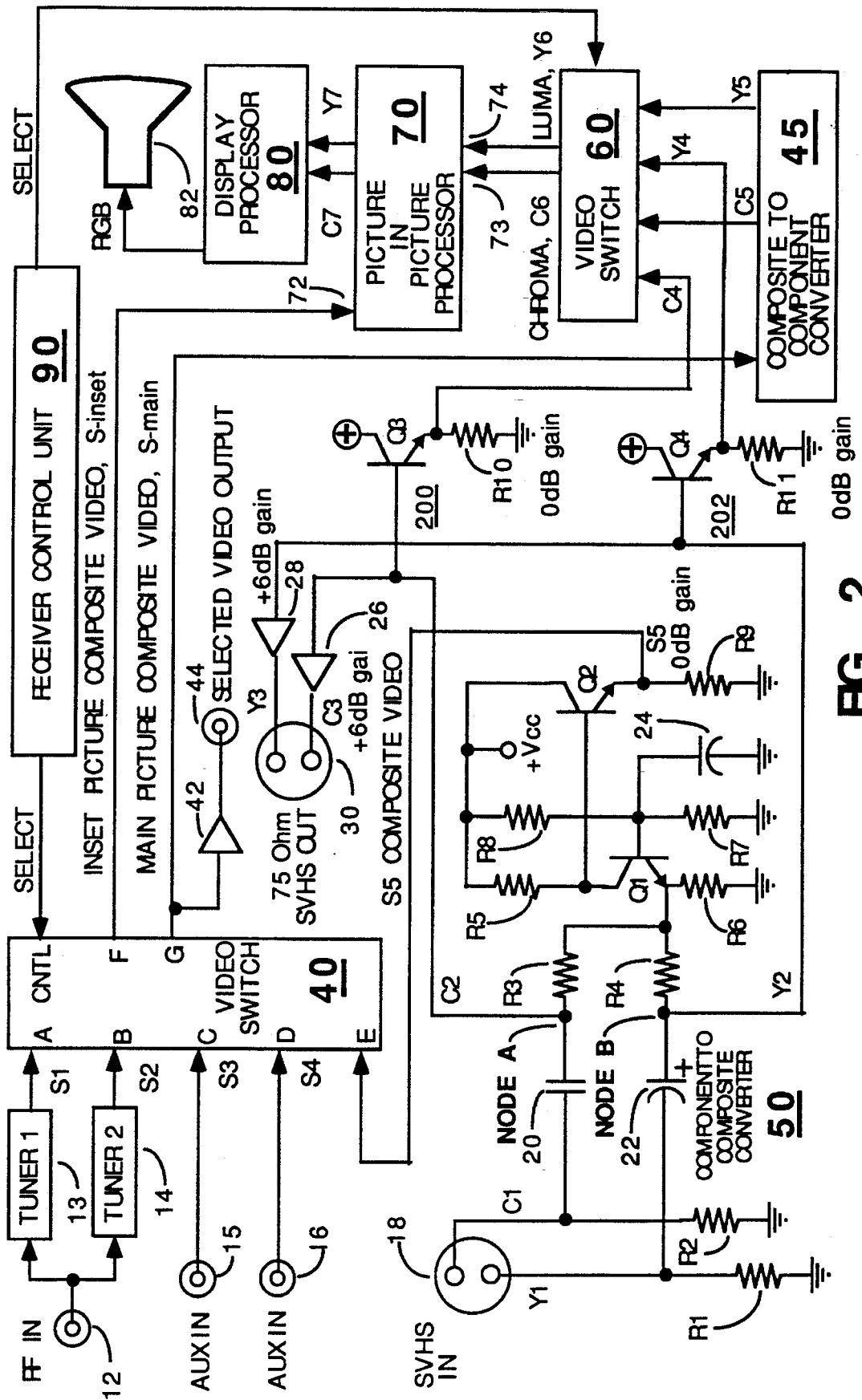
FIGS. 2 and 3 are block diagrams, partially in schematic form, illustrating additional details of the receiver of FIG. 1.

FIG. 2 illustrates a modification of the receiver of FIG. 1 in which the unity gain buffer amplifiers 32 and 34 of FIG. 1 are implemented by means of emitter followers 200 and 202, respectively. Specifically, follower 200 comprises a transistor Q3 having a base connected directly (DC coupled) to node "A", having a collector coupled to a source ("+") of positive supply potential and having an emitter coupled to supply chrominance signal C4 to video switch 60 and coupled via a load resistor R10 to ground. Similarly, follower 202 comprises a transistor Q4 having a base connected directly (DC coupled) to node "B" having a collector coupled to the source of positive supply potential and having an emitter coupled to supply luminance signal Y4 to video switch 60 and coupled via a load resistor R11 to ground. Since emitter followers exhibit substantially unity gain (0 dB), operation of the modified receiver with followers 200 and 202 replacing unity gain amplifiers 32 and 34 is exactly the same as previously described in FIG. 1.

Figure 3:
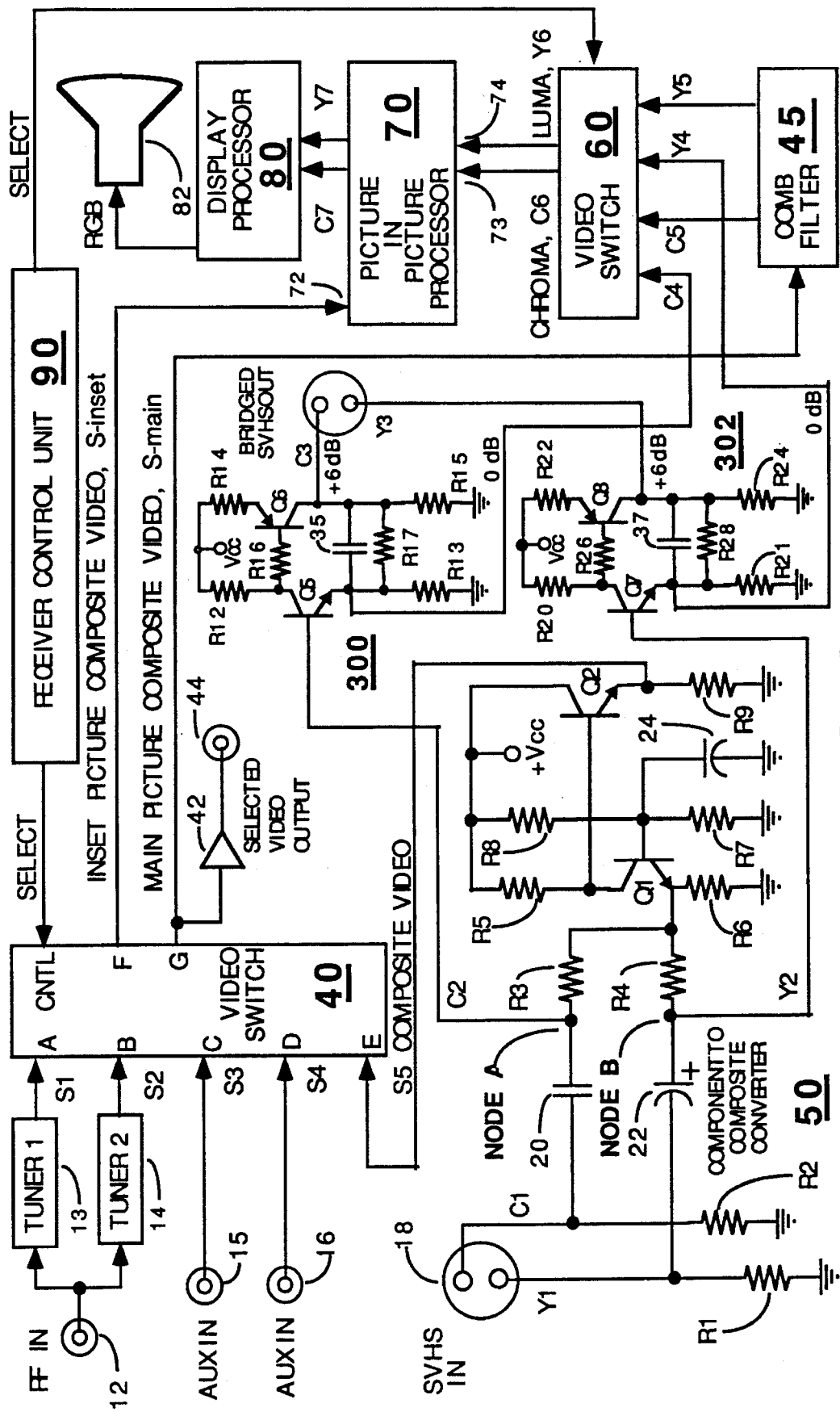

FIG. 3 illustrates a modification of the receiver of FIG. 1 in which the +6 dB amplifier 26 and the 0 dB amplifier 32 are implemented by means of a two stage amplifier 300. Similarly, the +6 dB amplifier 28 and the 0 dB amplifier 34 of FIG. 1 are implemented by an identical two stage amplifier 302 in FIG. 3.

More specifically, amplifier 300 comprises an NPN transistor Q5 having a base electrode direct coupled to node "A" for receiving the chrominance signal C2, having an emitter coupled to ground via an emitter load resistor R13 and coupled also to supply the buffered chrominance signal (C4) to video switch 60. Since the output of Q5 is taken from its emitter, transistor functions for signal C4 as an emitter or "voltage follower" providing a gain of 0 dB (unity) for the signal C4.

To provide +6 dB of voltage gain for the bridged SVHS chrominance output signal C3, the collector of NPN transistor Q5 is coupled via a load resistor R12 to supply Vcc and via coupling resistor R16 to the base of a PNP transistor Q6 which functions as a common emitter amplifier to provide +6 dB of gain for chrominance signal C3. Specifically, the emitter of transistor Q6 is coupled to supply Vcc via resistor R14 and the collector is coupled to supply signal C3 to the SVHS output connector and is coupled to ground via load resistor R15. The gain (+6 dB) of the amplifier for signal C3 is determined by feedback from the collector of transistor Q6 to the emitter of transistor Q5 via resistor 17 and capacitor 35.

To summarize, briefly, amplifier 300 in FIG. 3 comprises a direct coupled emitter follower amplifier (NPN transistor Q5) having a gain of unity (0 dB) as to the chrominance output signal C4. It further comprises a direct coupled common emitter amplifier (PNP transistor Q6) that is directly connected between an output (collector) of the emitter follower amplifier and the bridging SVHS output and having a voltage gain of substantially 6 dB.

Amplifier 302 (e.g., Q7, Q8, R20–28, cap. 37) is of the same construction as amplifier 300 and is connected to amplify luminance signal Y2 to provide output signal Y3 at a gain of +6 dB and Y4 at a gain of 0 dB. The overall functions of amplifiers 300 and 302 in the receiver are same as previously described for the individual amplifiers 26, 32 and 28, 34 in the example of FIG. 1.

Figure 4:
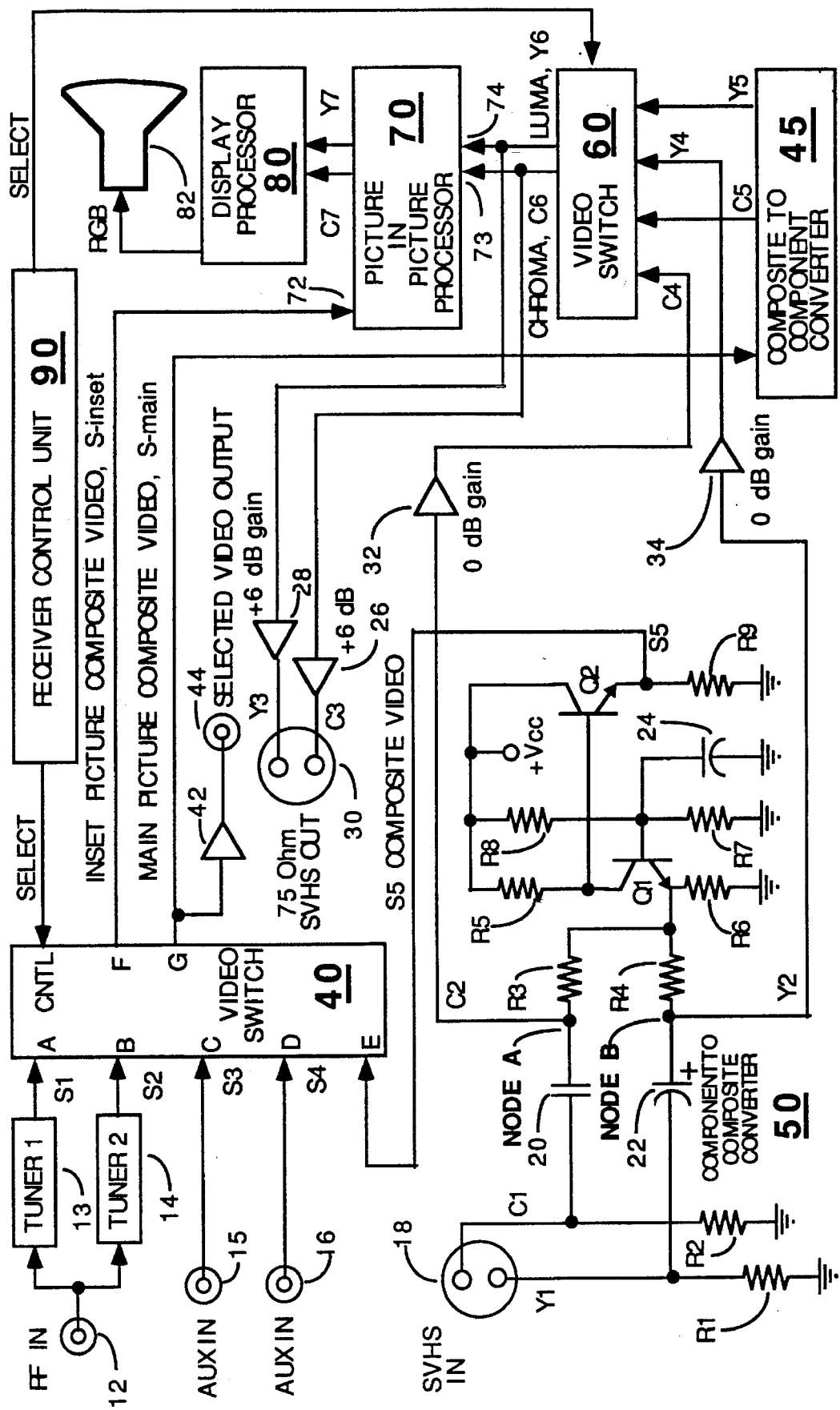
FIG. 4 illustrates a modification of the receiver of FIG. 1.

FIG. 4 illustrates a further modification of the example of FIG. 1 in which the buffer amplifiers 26 and 28 are reconnected to couple the chrominance C6 and luminance Y6 outputs of switch 60 to the SVHS output connector 30. Recall from the previous discussion that connector 30 was used to "loop through" the receiver thereby enabling one to simultaneously record SVHS component signals applied to the SVHS input connector 18. In this modification the loop through feature is retained when SVHS input signals are selected for viewing on the main picture area of display 82 because in such a case switch 60 couples the buffered SVHS components C4 and Y4 to inputs 73 and 74 of PIP processor 70. However, in the modified version, when one of the composite video signals S1–S4 is selected for display, switch 60 selects the output of converter 45. Accordingly, the selected composite signal is applied via converter 45 and switch 60 through buffers 26 and 28 to the SVHS output connector 30 as component signals. Thus modified, the receiver provides component output signals (C6 and Y6) both when SVHS input signals are selected for the main picture display and when one of the composite input signal S1–S4 is selected for display as the main picture on display 82.

What is claimed is:

1. Apparatus, comprising:
   a summing amplifier having an input and an output;
   a bias source connected to said summing amplifier for producing a first DC bias at said input and a second DC bias at said output;
   a first circuit node AC coupled to a luminance signal source, DC coupled via a first resistor to the input of said summing amplifier and DC coupled via a first amplifier to a luminance signal load;
   a second circuit node AC coupled to a chrominance signal source, DC coupled via a second resistor to said input of said summing amplifier and DC coupled via a second amplifier to a chrominance signal load; and
   a third amplifier for DC coupling said output of said summing amplifier to a composite video signal load.

2. Apparatus, as recited in claim 1 wherein:
   said summing amplifier exhibits a gain of unity;
   said first and second amplifiers each is of unity gain; and
   said third amplifier is also of unity gain.

3. Apparatus, as recited in claim 1, wherein:
   said summing amplifier exhibits a gain of unity;
   said first and second amplifiers each provide a gain greater than unity; and
   said third amplifier provides a gain of unity.

4. Apparatus as recited in claim 2 further comprising:
   fourth and fifth amplifiers, each coupled between a respective one of said circuit nodes and a respective further load, each having a gain greater than unity.

5. Apparatus as recited in claim 3 further comprising;
   fourth and fifth amplifiers, each coupled between a respective one of said circuit nodes and a respective further load, each having a gain of unity.

6. Apparatus, comprising:
   a first source for providing a luminance signal;
   a second source for providing a chrominance signal;
   a summing amplifier having a first summing input AC coupled to said first source, having a second summing input AC coupled to said second source, and having an output for providing a composite video output signal;
   a first DC coupled output amplifier for coupling said composite video output signal from said output of said summing amplifier to a first load;
   a second DC coupled output amplifier for coupling said luminance signal from said first summing input of said summing amplifier to a second load;
   a third DC coupled output amplifier for coupling said chrominance signal from said second summing input of said summing amplifier to a third load; and
   a bias source in said summing amplifier for producing a first DC bias at the output of said summing amplifier for DC biasing said first output amplifier and for producing a second DC bias at said first and second summing inputs of said summing amplifier for DC biasing said second and third output amplifiers.

7. Apparatus as recited in claim 6 further comprising:
   fourth and fifth DC coupled output amplifiers for coupling said luminance and chrominance signals from respective ones of said summing inputs of said summing amplifier to respective fourth and fifth loads.

8. Apparatus as recited in claim 7 wherein said fourth and fifth DC coupled output amplifiers exhibit signal gains greater than unity.

9. Apparatus as recited in claim 6 wherein said second output amplifier comprises a direct coupled emitter follower amplifier having a gain of unity and further comprising a direct coupled common emitter amplifier connected between an output of said emitter follower amplifier and a further load and having a voltage gain of substantially 6 decibels.

10. A component to composite video converter, comprising:
    a source (18) for providing a component video input signal including a luminance component Y1 and a chrominance component C1;
    first and second circuit nodes (A, B) AC coupled to said source for receiving respective ones of said video input signal components;
    a summing amplifier (Q1) having a relatively low impedance signal input terminal for summing currents supplied thereto, having an output load (R5) for developing a composite video signal proportional to the summed currents at said input terminal and having a bias input terminal coupled to a bias voltage source (R7,R8,24,Vcc) for establishing a first predetermined DC level at said signal input terminal and a second predetermined DC level at an output of said amplifier;
    first and second resistors connected between respective ones of said circuit nodes and said signal input terminal of said summing amplifier for (i) applying the currents to said input terminal proportional to the AC components of said video input signal components for forming said composite video signal, for (ii) applying said first predetermined DC level produced at said signal input terminal of said summing amplifier to each of said first and second circuit nodes and (iii) providing resistance values selected relative to said output load of said summing amplifier for determining a relative gain for each component video signal summed;
    at least first, second and third utilization devices;
    a first DC coupled amplifier for coupling said output load of said summing amplifier to said first utilization device, a second DC coupled amplifier for coupling said first circuit node to said second utilization device and a third DC coupled amplifier for coupling said second circuit node to said third utilization device.

* * * * *